Jan. 6, 1948. O. OSWALD Re. 22,962
CARBURETOR
Original Filed Sept. 28, 1939 3 Sheets-Sheet 1
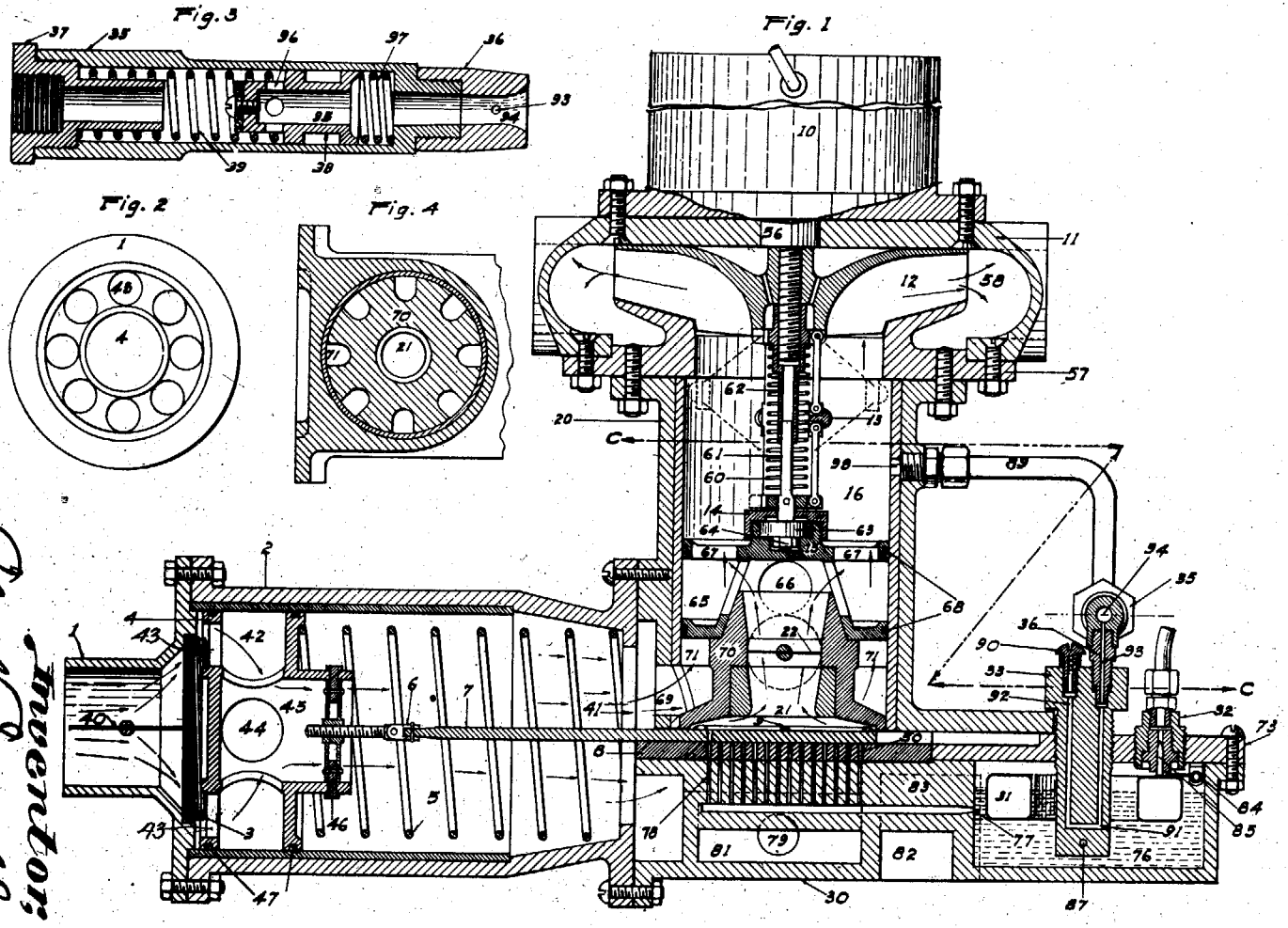
Inventor;
Olaf Oswald Jan. 6, 1948. O. OSWALD Re. 22,962
CARBURETOR
Original Filed Sept. 28, 1939 3 Sheets-Sheet 2
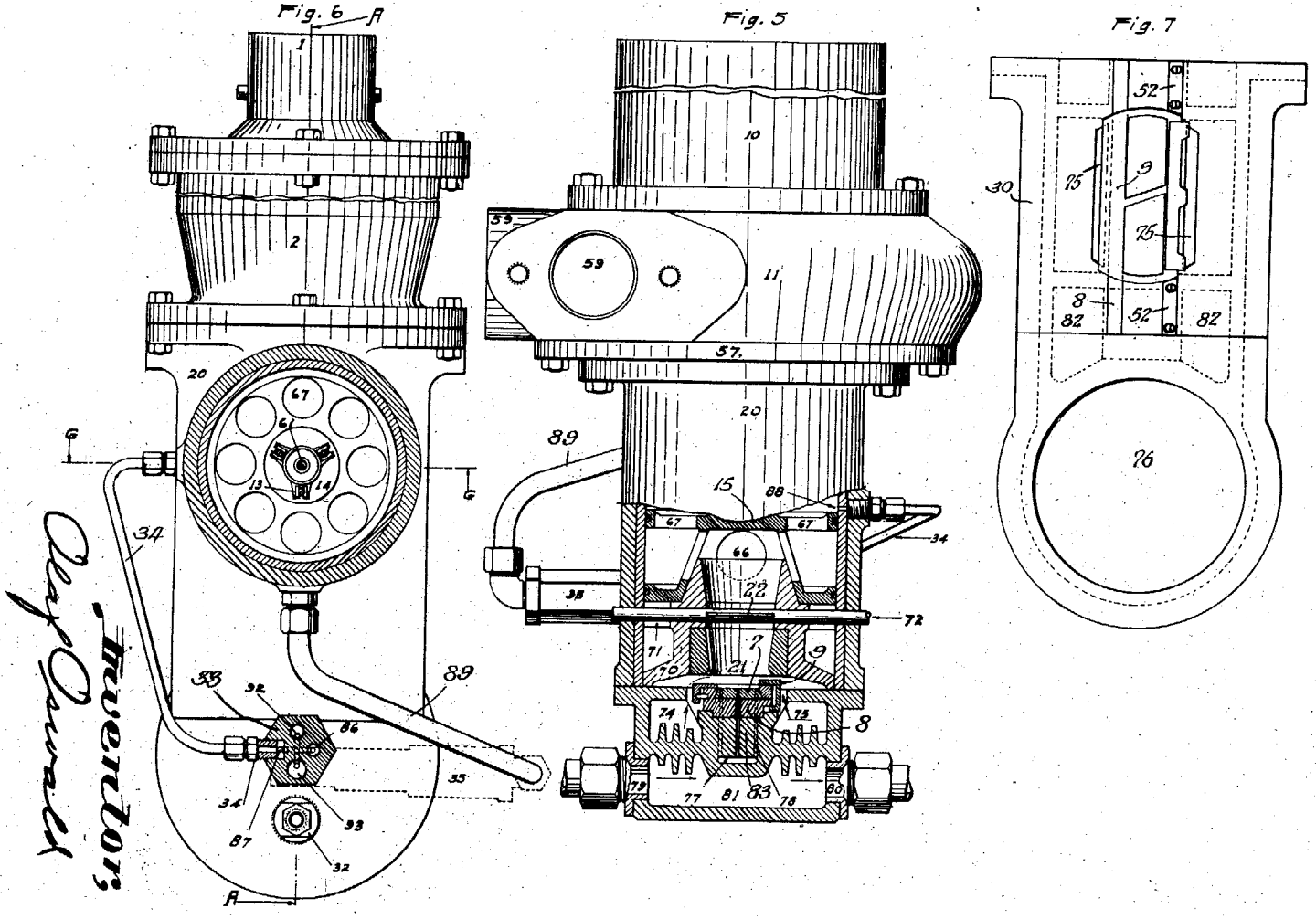

Jan. 6, 1948. O. OSWALD Re. 22,962
CARBURETOR
Original Filed Sept. 28, 1939 3 Sheets-Sheet 3
Fig. 8
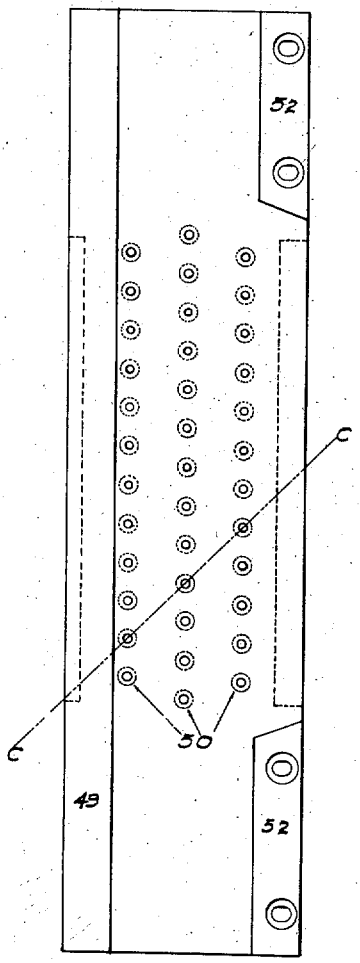
Fig. 11
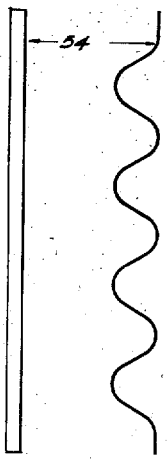
Fig. 9
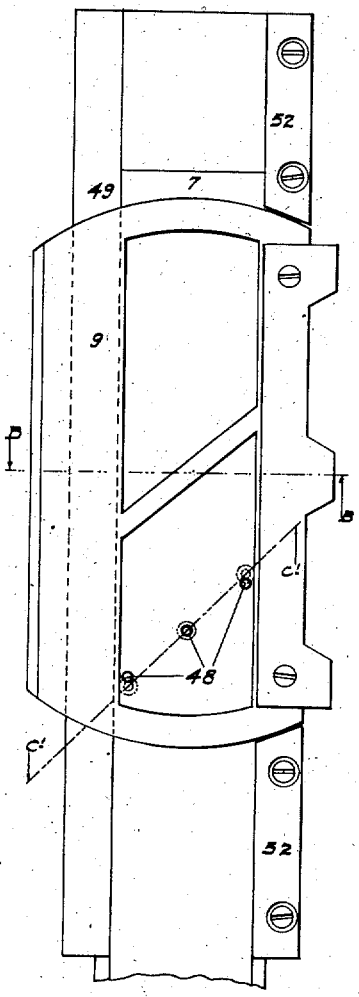
Fig. 10
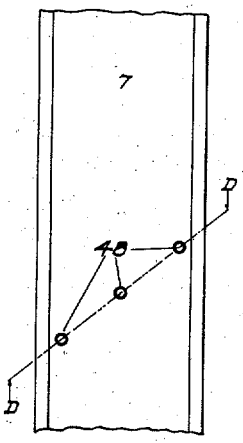
Fig. 8-A
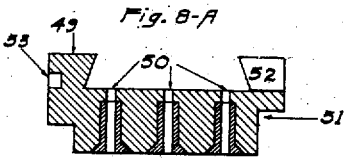
Fig. 10-A
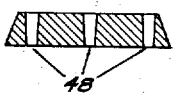
Fig. 9-A
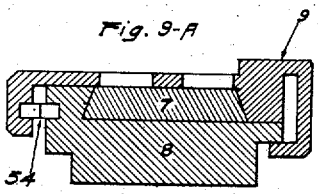
Witnesses
Alberta C. Elliott
Sylvia Leslie Bryant
INVENTOR
Olaf Oswald Reissued Jan. 6, 1948

Re. 22,962

UNITED STATES PATENT OFFICE 22,962

CARBURETOR

Olaf Oswald, Honolulu, Territory of Hawaii

Original No. 2,393,118, dated January 15, 1946, Serial No. 296,967, September 28, 1939. Application for reissue February 11, 1946, Serial No. 646,799½

32 Claims. (Cl. 123—119)

This invention relates to carburetors, my purpose being to provide a device of this character which will accomplish automatically and according to engine speed the following objects:

A—Control of fuel mixture.
B—Improved volatilization of fuel.
C—Increased weight of air-fuel charge.
D—Cooling of engine, and braking effect.
E—Sudden acceleration.
F—Fuel economy.

My carburetor embodies many novel features of construction and combinations and arrangements of parts, all of which will be more fully hereinafter described and pointed out in the claims.

In the accompanying drawings—

Fig. 1 is a view in longitudinal section through my improved carburetor, on the line A—A of Fig. 6.

Fig. 2 is a left end view (Fig. 1) of air cylinder 2 (reduced size) showing air ports 43 of air piston 4.

Fig. 3 is a view in horizontal section through my accelerator assembly which is indicated generally by the numeral 35.

Fig. 4 is a view in horizontal section through piston seat 70, illustrating air ports 71.

Fig. 5 is a view in partial transverse section on the line G—G of Fig. 6, viewed as facing fuel bowl 76.

Fig. 6 is a view in horizontal section on the irregular section-line C—C of Fig. 1, emphasizing governor assembly 13, ports 67 of the mixing valve piston 15, plug 33, idler assembly 34, accelerator assembly 35, and fuel inlet 32.

Fig. 7 is a plan view of the body 30, illustrating my improved slide bar, jet casing, slide bar guide-cover, primary air ports, blind ports (shown by dotted lines), and fuel bowl.

Fig. 8 is an enlarged plan view of my improved slide bar casing.

Fig. 8—A is a view in transverse section on the line C—C of Fig. 8.

Fig. 9 is an enlarged plan view of assembly of slide bar, jet casing, and slide bar guide-cover, showing the relative positions of slide bar discharge openings and jets in casing, the latter being the dotted circles.

Fig. 9—A is a view in transverse section on the line B—B of Fig. 9, with fuel jets omitted.

Fig. 10 is an enlarged fragmentary plan view of my improved slide bar, showing discharge openings 48.

Fig. 10—A is a view in transverse section on the line D—D of Fig. 10.

Fig. 11 is a side view and a longitudinal section (enlarged) of spring 54 of slide bar guide-cover 9, this spring being shown in working position on Fig. 9—A.

Throughout the drawings the numeral 2 designates my horizontal air cylinder, this cylinder having bolted to its intake end the choke tube 1 containing valve 40, and is bolted at its discharge end to the vertical flanges of central body 30 and mixing chamber housing 20. Cylinder 2 contains air piston 4 adapted to slide therein, piston recoil spring 3, piston coil compression spring 5. Air piston 4 is provided with end ports 43 opening into the central annular space 42 which communicates with central bore 45 through side ports 44. These end and side ports and the central bore are of area sufficient to pass therethrough the maximum quantity of air required by the engine. Fitted into the open end of central bore 45 is wristpin 46 into which is inserted the threaded end of adjustable (longitudinally) universal joint 6, this member 6 being operatively connected to the end of slide bar 7. Piston 4 is preferably fitted with the rings 47, but may instead be provided with several shallow compression grooves. A coil spring 5 in cylinder 2 exerts pressure on the piston 4 to hold it in idling position against the recoil spring 3.

Central body 30 and its fuel bowl cover 73 are cast or otherwise made to conform with the arrangement of chambers and other parts as follows: A fuel bowl 76 is provided in the body 30 and is equipped with a float 31 hinged to the cover 73 and having a valve 85 which controls a fuel inlet 32 supplying fuel to the bowl so that the float operates to maintain the desired level of fuel in the bowl. The fuel outlet from the bowl consists of a main fuel duct 77 which is substantially horizontal and located below the liquid level in the bowl. This main fuel duct is narrowed to a slit at its intake end, and communicates with a plurality of parallel vertical jet feeder ducts 78 which are preferably out of transverse alinement with each other and in direct vertical juxtaposition with the jets 50 in the casing 8.

This jet casing 8 is centered on the longitudinal axis of the body 30 and countersunk flush with its upper surface, having guides parallel with said axis, the guide 49 being formed of the main body of the casing. The guides 52 are separately formed although with the same inner angle of slope as guide 49, the slots for the screws holding guides 52 to the casing 8 being such that said guides 52 are adjustable transversely. This jet casing 8 is bored for jets 50 which may be taper-fitted or screwed into place and therefore replaceable, having countersunk heads on under side of casing 8. These jets communicate with upper or sliding surface of casing 8 preferably by means of shallow holes of diameter equal to the maximum discharge diameter of the jets selected. These jets are arranged in rows parallel to the longitudinal axis of casing 8 and preferably out of transverse alinement with each other.

I preferably employ, for the purpose of controlling the outlets of jets 50, my improved slide bar 7 which is provided with openings 48 out of transverse alinement with each other. The relationship of openings 48 to jets 50 is preferably as illustrated in Fig. 9, the central opening 48 being in vertical juxtaposition with one central jet 50 and the two outer jets being indicated by dotted circles.

Slide bar 7 is guided generally by the fixed guide 49 and the adjustable guides 52, and guided specifically by the self-adjusting guide-cover 9, this latter element being held in position against upward thrust by its inwardly projecting portion engaged in the groove 51, and held in place against slide bar 7 by means of the flat transversely corrugated spring 54 (Fig. 9—A), this spring being confined lengthwise in lefthand groove of guide-cover 9 and the casing groove 53. The purpose of this element 9 is to at all times keep the sliding surface of slide bar 7 snugly against jet discharge surface of casing 8 and to automatically compensate for any wear of the sliding surfaces of slide bar 7 and its casing 8. Guides 52 are adjusted to an easy fit against bar 7, the purpose being to insure that the bar 7 shall not get out of control or alinement in the event of a mechanical failure of the spring 54.

The central body 30 has formed in it a central wall 83, primary air ports 74 opening from vertical flange of said body, distribution air ports 75 opening upward from primary air ports 74, hot spot chamber 81 being adapted at entry port 79 and at exhaust port 80 for conventional pipe or tubing connections respectively with a source of heat and a means of discharge. Projecting downward from roof of hot spot chamber are riffles as illustrated in Fig. 5. Projecting upward from floor of primary air ports 74 are corresponding riffles. Also formed in the body 30 are blind ports 82, open to the atmosphere on the under side preferably, their function being to insulate the fuel bowl 76 against over-heating.

The reference numeral 20 is employed to designate the mixing chamber housing, the lower flange of which is bolted to central body 30 and the upper flange fastened to lower blower housing 57. Opening from vertical flange of housing 20 is auxiliary air entry port 69. Pressed into place flush with lower flange of this housing 20 is the piston seat 70 which is provided with air ports 71. Fitted into the lower portion of this piston seat is the venturi 21, which is removable and may be held in place by any suitable means such as a set screw. Venturi 21 and ports 75 are so formed and adapted that the low pressure area is at slide bar jet outlets. Approximately centered transversely in piston seat 70 is throttle valve 22 on its shaft 72. This throttle valve controls directly only the primary air-fuel mixture.

A mixing valve piston 15 is mounted to move in mixing chamber 16, its upper end being connected to the centrifugal governor assembly 13 by means of swivel bearing 63, shaft 61, cap 14, and lock nut 64, upward movement of piston being resisted to some degree by a spring 60 of compressive strength just sufficient to hold the piston in its idling position as illustrated by Figs. 1 and 5.

The piston 15 is formed with a central bore the lower portion of which is contoured to fit piston seat 70 and the upper portion of which communicates through side ports 66 with central annular space 65 whence open into mixing chamber 16 the end ports 67 of this piston. The said ports or passages are of proportions and aggregate area adapted to pass therethrough the maximum fuel mixture requirements of the engine. Piston 15 is preferably provided with rings 68, but may have instead several shallow grooves on each sliding surface.

The reference numeral 13 is employed to designate my governor assembly which is operatively fastened at its upper end to motor shaft 56 by means of sleeve 62 into the open end of which sleeve telescopes the shaft 61 against the tension of spring 60. For this spring 60 may be substituted a like element of diameter approximately equal to the periphery of chamber 16 and extending vertically between the top of piston 15 and inner projection of lower housing 57.

The reference numeral 12 designates the blower or impeller, which is operatively fastened to motor shaft 56, this shaft passing through upper housing 11, and housing 11 being adapted for intake manifold connections at 59. This impeller is adapted to augment the engine suction effect to the end of compacting the fuel charge in the engine cylinders.

Reference numeral 10 designates the motor, which is based on top of housing 11 and adapted for electrical connection with an engine-operated generator. This motor is adapted to operate at a speed in ratio proportionately greater than any given engine or engine generator speed, and accordingly the armature and fields thereof are preferably wound with wire of lower resistance than its generator and of as low resistance as may be consistent with the required number of windings within the physical limits of the armature spool and field magnets, said motor being preferably of the type known to the art as "series-wound and self-excited."

This motor 10, or equivalent motive power, is essential to my invention because by its operative connections with the impeller 12, the governor assembly 13, and the mixing valve piston 15 the said piston is enabled to function, and this movement of the piston 15, under whichever of the objects and purposes of this invention, is thereby in ratio with engine speed.

I am aware that other forms of motive power might be adapted to actuate the aforesaid elements, such power, for instance, as could be supplied by gears and shaft or pulleys and belt connection with the engine, or by means of an exhaust-driven turbine; but my motor has many specific advantages over such other sources of power, such as (*a*) ease of control to cut out motor, by means of an electrical switch available to the engine operator, when it is desired, for instance, to avoid object "D" during adverse weather conditions.

Other advantages obviously inherent in this particular source of power are, (*b*) fewer moving parts to wear and become maladjusted, (*c*) a minimum of noise and vibration, (*d*) simplicity and economy of installation.

Reference numeral 33 designates a plug screwed or otherwise properly passed through the fuel bowl cover 73 and extending below the liquid level in fuel bowl 76, this plug containing idler air duct 86, idler fuel duct 87, accelerator air adjustment screw 90, accelerator air duct 92, and accelerator fuel duct 91.

Suitably connected to the plug 33 is idler mixture tube 34 which discharges into mixing chamber 16 through the duct 88 just above top of mixing valve piston 15 at idling position illustrated in Fig. 5.

Accelerator riser 36, suitably connected with the plug 33, forms operatively an integral part of accelerator cylinder 35 which is provided at its open end with the restriction or Venturi tube 94 into which opens mixture duct 93. Adapted to move in cylinder 35, against the tension of coil spring 39, is piston valve 38 having a central bore 95 communicating with side ports 96 opening into cylinder 35. For the recoil of the valve 38 I preferably employ the coil spring 97. The closed end of piston valve 38 is preferably fitted with a washer of some suitable material, as illustrated in Fig. 3, or otherwise mechanically adapted to form an air-tight joint when on its seat at inner end of the plug 37. Suitably connected to the plug 37 at its discharge end is the accelerator mixture tube 89 which discharges into mixing chamber 16 preferably through the duct 98, or which may be adapted and connected so as to discharge into housing 11, or through individual connections at each arm of intake manifold of engine to which this carburetor may be attached.

It is obvious that it would be within the spirit and scope of my invention to reverse the relative positions of the series of jets 50 and the slide bar outlets 48.

To attain, among others, the objects hereinabove specifically outlined, my invention operates as follows:

*Object "A."*—Upon starting of the engine to which this carburetor may be attached, idler assembly 34 draws fuel from chamber 76 through fuel duct 87 and air through air duct 86, the mixture then being drawn through the tube 34 and discharged into mixing chamber 16 through the duct 88 just above mixing valve piston 15 in the idling position illustrated in Fig. 5.

The main air supply enters choke tube 1 past the choke valve 40 and then through end ports 43, side ports 44 and central bore 45 of the air piston 4, and thence into the horizontal air cylinder 2, dividing beyond the cylinder outlet 41 into primary and auxiliary air supply. The primary air supply, upon opening of throttle valve 22, passes through primary air ports 74 and distribution air ports 75 and thence is drawn past the jet discharge openings 48 of the slide bar 7, the mixture continuing upward through venturi 21.

As the engine speed increases beyond idling due to the opening of throttle valve, the rotation of armature of motor 10 through its operative connections causes the mixing valve piston 15 to lift off its seat 70, thereby allowing auxiliary air present in port 69 to enter piston seat ports 71, this auxiliary air then passing between central bore of piston 15 and its seat 70 and mingling with the primary fuel mixture emerging from top of piston seat 70, the total fuel mixture then passing through side ports 66 and end ports 67 of piston 15 into mixing chamber 16 whence it is drawn upward by the suction of impeller 12 and through the impeller mixing chamber 58, thence passing through connections 59 to intake manifold of engine.

Pressure of the incoming air against and rushing through air piston 4 causes this piston to move forward against the tension of spring 5, this movement being imparted to slide bar 7 by means such as the wristpin 46 and the universal joint 6. Such movement of slide bar uncovers progressively the discharge openings of jets 50 to the end that at any position of the slide bar the full discharge area of one jet or its equivalent in the partially exposed discharge areas of several jets shall deliver fuel into the air supply admitted by the throttle opening corresponding to such position of the slide bar.

*Object "B."*—Exhaust gases from the engine in passing through hot spot chamber 81 impinge upon and heat central wall 83 of the body 30 which contains the main fuel duct 77. As this main fuel duct is narrowed to a slit at fuel bowl 76, only the fuel contained in said duct and in the jet feeder ducts 78 is heated, the fuel in bowl 76 being insulated from the remainder of the body 30 by the blind ports 82 which are preferably open to the atmosphere on the under side of the body 30. The heat thus acquired by the downward projecting riffles of chamber 81 is transmitted upward to the corresponding riffles rising from floor of primary air ports 74, which heat is picked up by the primary air supply passing through ports 74. The heat thus imparted to both the fuel and the primary air supply has the known effect of greatly facilitating the volatilization of the fuel to the end of a homogeneous and combustible fuel charge to the engine.

*Object "C."*—The weight of the fuel charge to the engine supplied by this carburetor is increased as compared with that supplied by carburetors of conventional design which heat all of the air supply or all of the air-fuel mixture because of two factors inherent in my said invention, i. e., (*a*) only the primary air supply is heated, the auxiliary air supply being at atmospheric temperature, (*b*) the total air-fuel mixture is compacted by the action of impeller 12.

*Object "D."*—When for any reason during the operation of engine employing this carburetor the throttle is suddenly closed but with clutch engaged, the primary air-fuel mixture is cut off from mixing chamber 16, but the attained momentum of vehicle incorporating said engine then drives the engine, and therefore through its electrical connection with engine generator the motor 10 continues to actuate the governor assembly 13, thus holding the mixing valve piston 15 off its seat and enabling auxiliary air at atmospheric temperature to continue passing through the mixing chamber 16 on its way to the heated cylinders of the engine, thereby cooling said engine and incidentally assisting in the engine braking effect upon said momentum.

*Object "E."*—As is well known to the art of carburetion, when the throttle is suddenly opened wider for purposes of acceleration an extra supply of fuel is momentarily required to offset the sluggish response of fuel in the jets because of the greatly lessened suction effect from that theretofore existing around the jets. This condition is taken care of by my accelerator assembly 35. Under normal engine operation, and especially during idling, the partial vacuum existing in mixing chamber 16 holds to its seat on plug 37 the accelerator piston valve 38 against the tension of spring 39. Upon sudden opening of throttle valve, suction ceases upon seat end of piston valve 38, spring 39 pushes piston valve 38 off its seat, and air enters accelerator Venturi tube 94, picks up fuel from mixture duct 93 and carries it through central bore 95 and side ports 96 of piston valve 38 and thence through cylinder 35, central bore of plug 37, mixture tube 89, and discharge duct 88 into mixing chamber 16, respectively.

It is obvious that certain structural portions of this accelerator assembly may be incorporated with other units of my invention without departing from its spirit and scope, as, for instance, creating integral with mixing chamber housing 20 a cylindrical recess or chamber in which the accelerator piston valve 38 shall function instead of the independent structure represented by the cylinder 35.

*Object "F."* Fuel economy is attained by the arrangements and elements of my carburetor not only by the volatilization effect described under object "B" hereof, but particularly by the selective action of slide bar 7 in uncovering progressively the discharge openings of the jets 50 which decrease generally in discharge area for increased engine speed. This arrangement of jets is based upon the fact well known to the art of carburetion that increased air flow induced by increased engine speed is attended by an increased flow of fuel from the jets in ratio greater than the increase in air supply, with the result of an undesirable enrichment of the fuel mixture and hence with a loss both of fuel economy and power efficiency where the jets involved are invariable in discharge area.

While I have illustrated and described what I believe to be the preferred embodiment of my invention, it is obvious that various changes might be made in the general form and arrangement of elements without departing from the invention. For example, the impeller housing 11 may be formed in one piece with intake manifold; again, in the fuel-metering mechanism either the slide bar or its casing may contain the plurality of series of fuel jets and these may or may not be out of transverse alinement with each other. Hence, I do not limit myself to the specific details set forth but reserve the liberty to make such changes and rearrangements as fairly fall within the spirit and scope of the appended claims.

I claim:

1. In a carburetor for an internal combustion engine comprising, in combination, fuel supply means, means for admitting total air supply, means for choking entrance to said air-supply-admitting means, means for automatically controlling and metering fuel discharge according to engine speeds, the last-named means being actuated and controlled by movement of an element within the second-named means due to pressure and energy of engine-suction-induced air or other gas impinging thereon and passing therethrough, automatic means utilizing exhaust gases for heating the primary air supply and the fuel supply ducts, means for admitting primary air supply and primary air-fuel mixture to carburetor mixing chamber, automatic means functioning in ratio with engine speed and adapted for so admitting and proportioning auxiliary air at atmospheric temperature as to maintain at substantially maximum weight and homogeneity a constant volume of combustible fuel mixture in mixing chamber, automatic means for further improving the homogeneity of the combustible mixture and compacting and thereby increasing the weight of the charge to the engine cylinders, said last-named means being adapted to function at a speed in multiple ratio with any given engine speed, operatively-connected idling fuel mixture supply means, and operatively-connected automatic means adapted for response to sudden throttle opening for supplying momentarily an air-fuel mixture for carburetion stabilization and acceleration purposes.

2. A carburetor for an internal combustion engine, comprising, in combination, fuel supply means, means for admitting and controlling total air supply, means for dividing total air supply into primary and auxiliary air supply, means for automatically controlling fuel discharge according to engine speeds, the last-named means being actuated and controlled by movement of an element within the second-named means in response to the pressure and energy of engine-suction-induced air impinging thereon and passing therethrough, means for admitting primary air-fuel mixture to a mixing chamber, means adapted to function automatically in response to and in ratio with engine speed for admitting and measuring auxiliary air supply and total air-fuel mixture supply to said mixing chamber, the last-named means being adapted also to assist in cooling the engine and in decelerating speed of vehicle employing said engine in response to attained momentum under closed throttle, engine-exhaust-heat-responsive means for improving fuel volatilization and homogeneity of air-fuel mixture, means automatically responsive to and in multiple ratio with engine speed for further improving fuel mixture combustibility and for compacting the fuel charge to the engine cylinders, and operatively-connected means for admitting an idling fuel mixture supply responsive to engine suction depending upon carburetor throttle position.

3. A carburetor for an internal combustion engine comprising, in combination, fuel supply means, means for admitting total air supply, means for dividing said air supply into primary and auxiliary air supply, means automatically responsive to engine-suction-induced air-flow for regulating fuel discharge area in inverse proportion to engine speed, throttle-controlled means for admitting primary air-fuel mixture to a mixing chamber, automatic means adapted to function in response to and in ratio with engine speed for measuring and admitting auxiliary air supply and total combustible mixture to said mixing chamber, the last-named means being adapted also for functioning automatically to assist in cooling and decelerating said engine in response to attained momentum under closed throttle, and operatively-connected means for admitting an idling fuel mixture supply responsive to engine suction depending upon carburetor throttle position.

4. A carburetor for an internal combustion engine comprising, in combination, total-air-supply means, fuel supply means, means adapted to respond automatically to engine speed for controlling, measuring and admitting fuel and auxiliary air supply and total air-fuel mixture, means for heating the fuel ducts and primary air supply, operatively-connected means responsive to engine suction depending upon carburetor throttle position for admitting an air-fuel mixture for engine idling purposes, operatively-connected means adapted for admitting to mixing chamber automatically and momentarily in response to sudden throttle opening an air-fuel mixture for purposes of carburetion stabilization and quick acceleration of the engine, throttle valve control over the primary air-fuel mixture, electrically operated means adapted to function in response to and in ratio with engine speed for simultaneously actuating means adapted for metering and controlling admission of the auxiliary air supply and for compacting the total air-fuel charge, this last-named admission-control means operating as well to simultaneously cool and assist in a braking effect upon the engine in response to attained momentum under closed throttle valve.

5. In combination, in a carburetor, means for admitting and metering auxiliary air or other gas and total air-fuel mixture supply to a mixing chamber discharging into and adapted for connection with an engine intake manifold and operatively connected with a central body provided with air and fuel supply means, said first-named means being embodied in a perforated piston valve adapted to move axially in said chamber to control discharge from peripheral ports in a valve seat at intake end of chamber, said seat being provided with a throttle-controlled central bore adapted to regulate admission of primary air-fuel mixture supply.

6. In a combination, means adapted for guiding longitudinal movement and preventing lateral and transverse variation from operative contact position of a slidable member and compensating automatically for wear of the several slide-contact surfaces involved, said means being preferably embodied in a casing generally guiding the movement of said member and having on one side manually adjustable guides, a self-adjusting guide-cover extending over and down both sides of casing and adapted by its outer configuration and by flexible means confined between itself and outside of casing on one side to hold said slidable member operatively against fixed guide on one side of casing and main sliding surface of casing.

7. In combination, in a fuel-metering mechanism, a slide bar adapted by its vertical perforations for selectively controlling the outlets of a series of vertical fuel ducts in the horizontal slide-contact surface of a casing having on one side a fixed guide and on the other side transversely adjustable guides for generally confining said slide bar, and means adapted for aiding said guides in preventing lateral and transverse movement of said bar and for automatically compensating for wear of the several slide-contact surfaces involved in operative movement of bar, said last-named means comprising a guide-cover extending over and down both sides of casing and adapted by its configuration and by flexible means confined between itself and casing on one outer side to hold said bar in operative contact position against main sliding surface of casing and its fixed guide.

8. In a fuel-metering mechanism for a carburetor, in combination, means adapted for controlling the outlets of a series of vertical fuel ducts of varying discharge area, said means comprising a vertically perforated bar slidable along and guided by a casing containing said ducts and having on one side a substantially vertical fixed guide and on the other side transversely adjustable guides, and automatic means adapted for aiding said guides in preventing lateral and transverse movement of said bar and for compensating for wear of the several slide-contact surfaces involved in operative longitudinal movement of bar.

9. In a carburetor for an internal combustion engine, fuel-metering means comprising, in combination, a vertically perforated bar preferably of trapezoid cross-section slidable in a casing to control the outlets of a plurality of series of vertical fuel ducts of varying discharge area in horizontal slide-contact face of casing, the casing having on one side a substantially vertical fixed guide and on the other side manually adjustable guides for generally confining said bar, a guide-cover bearing against one slide edge of bar and a portion of duct-discharge surface of casing and extending over the top of said bar and down both sides of casing, said guide-cover being provided with an undercut projection which engages a projection or groove on the adjustable-guide-side of casing and having a longitudinal groove on its downwardly projecting lip on fixed-guide-side of casing, said last-named side of casing being provided with an opposing similar longitudinal groove, and flexible means confined between said longitudinal grooves and adapted to hold said guide-cover in its operative lateral and downward thrust against said bar and casing, said guide-cover being open for the width and length of said series of fuel ducts to permit vertical fuel discharge.

10. In a combination, automatic means for actuating and controlling movement of an operatively connected slidable element guided generally in longitudinal movement by a casing, said actuating means being adapted for proportionate axial movement in a chamber by utilizing the varyingly induced pressure and energy of air or other gas flowing through said means and chamber, said controlling means being adapted to coact with said casing to prevent lateral and transverse movement of said slidable element.

11. In combination, in a carburetor for an internal combustion engine, automatic actuating means operatively connected with fuel-metering means, the first-named means utilizing the pressure and energy of engine-suction-induced air or other gas flowing through a perforated piston adapted to move axially in a cylinder in response to and in ratio with said energy, the second-named means comprising a perforated slidable member controlling the outlets of fuel ducts, means for guiding said slidable member, the said guiding means comprising a casing provided with said ducts and having manually adjustable casing guides, a guide-cover adapted to hold said slidable member against guide on one side of casing and main sliding surface of casing, said guide cover being slotted over said slidable member to allow of fuel discharge through perforations in said member.

12. In a carburetor for an internal combustion engine, the combination of automatic actuating means operatively connected with fuel-metering means, the first-named means being adapted for utilizing the varying pressure and energy of engine-suction-induced air or other gas admitted therethrough to move in a chamber in ratio with said energy, the said fuel-metering means being embodied in a perforated slidable member adapted for controlling the outlets of fuel ducts selectively of discharge area generally in inverse ratio with said energy and guided in longitudinal movement by elements adapted to keep it in operative contact with discharge outlets of said ducts.

13. In a carburetor for an internal combustion engine, the combination of automatic actuating means operatively connected with fuel-metering means, the first-named means comprising a piston adapted to move axially in a cylinder in response to engine-suction-induced air-flow through its perforations and said cylinder, the second-named means being embodied in a perforated slide bar operatively connected to said actuating means and adapted to be guided by a casing and a guide-cover, the guide-cover being adapted to hold said bar in operative contact against fixed guide and main sliding surface of casing and slotted on top to permit of fuel discharge through said bar, the casing being provided with a plurality of series of fuel ducts of varying discharge areas adapted for control selectively by movement of said bar.

14. In a carburetor for an internal combustion engine, the combination of automatic actuating means with fuel-metering means, the first-named means being embodied in a spring-loaded air-flow-responsive perforated piston adapted to move axially in a cylinder in ratio with the velocity of engine-suction-induced air-flow through its perforations and said cylinder, the second-named means being embodied in a jet slide bar operatively connected to said piston and guided generally in horizontal movement by a casing provided with a plurality of series of vertical fuel ducts of varying discharge area adapted for vertical alinement with jets in bar and controlled selectively according to movement of bar, and a guide-cover adapted to permit of fuel discharge from said jets and to automatically keep in operative juxtaposition the sliding surfaces involved in such movement of slide bar.

15. In a carburetor for an internal combustion engine, in combination, a central body having a fuel bowl therein, fuel and primary air heating means comprising a hot-spot chamber in the body adapted for conventional connections respectively with a source of heat and discharge means, a central wall in the body positioned in hot-spot chamber and having a main fuel duct communicating between the bowl and a plurality of vertically extending jet feeder ducts, primary air supply ports in the body adjacent to hot-spot chamber, means for admitting and controlling total and auxiliary and primary air supply, and means for directing said primary air supply past the outlets of said ducts, and means for measuring and controlling discharge of fuel and auxiliary air supply contained in enclosing means operatively connected with said central body and adapted for connection with intake manifold of engine.

16. In a carburetor, in combination, air and fuel supply means, automatic means for controlling discharge of said fuel, means for heating the fuel and the primary air supply, throttle-controlled primary air-fuel-mixture-supply means, and automatically controlled auxiliary-air-supply means and total-air-fuel-mixture-supply means.

17. In a carburetor, in combination, a central body having a fuel supply and a plurality of series of fuel feeder ducts communicating with said fuel supply, means for heating the fuel in said ducts and the primary air supply, means for selectively controlling the outlets of said ducts, said control means being mounted on said body and comprising a casing, a guide-cover, and a perforated bar, said bar being slidable in and partially guided by the casing which has on one side a fixed guide and on the other side transversely adjustable guides for generally confining the bar, the guide-cover being adapted to permit discharge of fuel from perforations of bar and to hold said bar in place closely against main sliding surfaces of casing, said casing being provided with a plurality of series of perforations in vertical juxtaposition with said fuel feeder ducts, an air-admitting cylinder containing means responsive to suction of engine employing carburetor for automatically actuating through an operative connection said fuel-control means, and a mixing chamber operatively connecting said central body and cylinder and adapted for connection with intake manifold of engine, said chamber containing throttle-controlled primary air-fuel-mixture-supply means and power-actuated means for admitting and metering auxiliary air supply and total fuel-mixture supply to mixing chamber.

18. In a carburetor for an internal combustion engine, in combination, a body having an air passage therein, a fuel supply bowl in the body, vertically extending jet ducts of varying discharge area communicating between the bowl and the air passage, a slide bar operatively connected with engine-suction-induced air-flow-responsive actuating means and adapted for controlling the outlets of said ducts by progressive selection of fuel-discharge area in ratio generally inverse with air-flow speed, and means for directing air past the outlets of the ducts.

19. In a carburetor for an internal combustion engine, in combination, means for metering auxiliary air supply, primary air-fuel mixture supply and total air-fuel mixture supply through openings in said means, comprising a perforated piston valve normally closing auxiliary air ports in the periphery of a piston valve seat in one end of carburetor mixing chamber and adapted to move axially in said chamber, said seat having a central bore provided with a throttle valve for controlling admission of primary air-fuel mixture supply from a central body operatively attached to seat end of said chamber, said chamber at its discharge end being adapted for connection with intake manifold of engine, and means operatively connected with said chamber and body adapted for admitting and controlling total air supply and for controlling selectively, in response to speed of engine-suction-induced air-flow therethrough, the fuel discharge area in ratio generally inverse with said speed.

20. In a carburetor for an internal combustion engine, in combination, throttle-controlled means for metering primary air-fuel-mixture supply and automatic means for metering and controlling admission of auxiliary air and total-air-fuel-mixture supply contained in a mixing chamber having its discharge end operatively fastened to a housing adapted for connections with intake manifold of engine and its intake end adapted for fastening to a central body provided with air and fuel supply control means, the said automatic air-and-mixture control means being embodied in a perforated piston valve normally closing auxiliary air ports in the periphery of a piston valve seat in intake end of chamber and adapted to control discharge from said ports and to move axially in said chamber by operative connection with a centrifugal governor on a shaft passing through said housing and adapted for power drive.

21. In a carburetor for an internal combustion engine, in combination, a mixing chamber having its discharge end adapted for connections with intake manifold of engine and provided with means for metering primary air-fuel-mixture supply and power-actuated means adapted to control and meter auxiliary air and total-air-fuel-mixture supply, the intake end of said chamber being adapted for fastening to a central body having an air passage therein, a fuel bowl in the body and jet ducts of varying discharge area connecting the bowl with the air passage, a slide bar controlling the outlets of the ducts, automatic means controlling the movement of the slide bar, and means for directing air past the outlets of the ducts.

22. A carburetor for an internal combustion engine, comprising, in combination, air supply means, fuel supply means, automatic engine-suction-induced air-flow-responsive means adapted to move axially in a cylinder for actuating through operative connection a fuel-metering mechanism in operative connection with a central body provided with a fuel bowl connected with jet ducts of varying discharge area and means for admitting primary air supply past the outlets of said ducts, a perforated slide bar controlling the discharge from the ducts, and operatively attached to said body at its discharge face being a mixing chamber provided at such attached end with an auxiliary air entry port communicating with said cylinder and with a valve seat having a plurality of peripheral auxiliary air discharge ports controlled by a spring-loaded piston valve adapted to move axially in said chamber by means of operative attachment to a shaft adapted for power-actuation, said seat having a central bore adapted for throttle-valve control, the discharge end of said chamber being adapted for connection with intake manifold of engine.

23. A carburetor for an internal combustion engine including, in combination, total-air-supply-control means contained in a choke tube operatively attached to intake end of a total-air-admission cylinder containing an air-flow-responsive piston adapted by its perforations and otherwise to move axially in said cylinder in ratio progressively with air-flow speed therethrough, a central body operatively attached to discharge end of said cylinder and formed with ports adapted to permit flow of primary air supply past the outlets of its contained fuel feeder ducts of varying diameter communicating with the source of fuel supply, means operatively connected with said piston for controlling the outlets of the ducts, said duct-control means being guided in longitudinal movement by a casing provided with perforations in vertical juxtaposition with said ducts and flexibly held in operative contact position in casing by a self-adjusting guide-cover, the said guiding means being mounted on the said central body, and operatively fastened to discharge face of said body being a mixing chamber containing throttle-controlled primary-air-fuel-mixture-supply means and power-actuated means for admitting and metering auxiliary air supply and total-air-fuel-mixture supply to said chamber, discharge end of said chamber being adapted for connection with intake manifold of engine.

24. A carburetor for an internal combustion engine comprising, in combination, total-air-supply-control means attached to intake end of an air admission cylinder containing an engine-suction-induced air-flow-responsive perforated piston adapted to move axially therein, a fuel bowl and primary-air-supply ports formed in a central body operatively attached to discharge end of said cylinder, fuel ducts connecting said fuel bowl with the primary air ports, means operatively connected with said piston for selectively controlling the outlets of the ducts, and operatively attached to top flange of central body being intake end of a mixing chamber having its discharge end adapted for connection with intake manifold of engine, said intake end of chamber being provided with an auxiliary air entry port communicating between said cylinder and a plurality of discharge ports in the periphery of a valve seat having a valve-controlled central bore adapted to regulate admission of primary-air-fuel-mixture supply, a piston valve adapted to move axially in said chamber to control said valve seat ports, and means operatively connecting fuel bowl with mixing chamber and adapted for inducing an idling fuel mixture supply in response to engine suction depending upon carburetor throttle position.

25. A carburetor for an internal combustion engine comprising, in combination, conventional air-intake-control means contained in intake end of a total air-admission cylinder having axially movable therein engine-suction-induced air-flow-responsive means adapted to actuate an operatively-connected fuel-discharge-control mechanism in operative connection with and mounted on a central body having an air passage and a fuel supply bowl in the body and fuel ducts of varying discharge area communicating with fuel bowl and air passage and said fuel-discharge control mechanism, means for directing the primary air supply past the outlets of the ducts, a mixing chamber operatively attached to central body and discharge end of cylinder and having auxiliary air supply means, throttle-controlled primary-air-fuel-mixture-supply means and power-actuated means adapted to control admission of auxiliary air and total-air-fuel-mixture supply, and engine-suction-responsive means operatively connecting fuel bowl with mixing chamber and adapted for discharging therein an idling fuel mixture supply depending upon carburetor throttle position, discharge end of mixing chamber being adapted for connections with intake manifold of engine.

26. A carburetor for an internal combustion engine comprising, in combination, fuel supply means, air supply-control means contained in intake end of a total air-admission cylinder having axially movable therein engine-suction-induced air-flow-responsive means adapted for actuating and controlling through operative connection the movement of fuel-metering control means operatively mounted on a central body having an air passage for primary air supply and a fuel bowl in the body and fuel ducts of varying discharge area connecting the bowl with said air passage, means for directing air past the outlets of the ducts, said central body being operatively attached to a mixing chamber provided with throttle-controlled primary-air-fuel-mixture-supply means and automatic means responsive to engine speed adapted for controlling and metering auxiliary air supply and total air-fuel-mixture supply when engine is under load and for admitting only an air supply when acquired momentum of vehicle employing said engine is driving the engine with throttle closed, idling-fuel-mixture-supply means operatively connecting fuel bowl with mixing chamber and responsive to engine-suction depending upon carburetor throttle position, the discharge end of said mixing chamber being operatively connected with an impeller housing adapted for connections to intake manifold of engine and containing total-air-fuel mixing and compacting means embodied in an impeller adapted for power-actuation and to revolve therein at speeds in multiple ratio with engine speeds, a centrifugal governor operatively connected with said auxiliary-air-supply and total-air-fuel-mixture-supply-admission control means.

27. A carburetor for an internal combustion engine comprising, in combination, fuel supply means, air-supply-control means contained in intake end of an air admission cylinder having axially movable therein air-flow-responsive means adapted for actuating and controlling fuel-metering means in operative connection with a central body having air and fuel supply means, means in open communication between exhaust manifold and exhaust pipe adapted for heating separately the fuel in the ducts and the primary air supply, a mixing chamber operatively attached to discharge face of central body and having auxiliary-air-supply means communicating with the operatively-attached discharge end of cylinder and means adapted to meter and admit to mixing chamber the primary air-fuel mixture supply, discharge end of said mixing chamber being provided with operatively connected power-actuated means adapted for metering and controlling admission of auxiliary air and total-air-fuel-mixture charge when engine is under load and for admitting only an air supply when acquired momentum of vehicle employing the engine is driving said engine with throttle valve closed, an impeller housing operatively attached to discharge end of mixing chamber and adapted for connections with intake manifold of engine and containing total-air-fuel-mixing and fuel-charge compacting means embodied in an impeller adapted to revolve in the housing at a speed in multiple ratio with any given engine speed by reason of its operative connection with said power-actuated means, idling air-fuel-mixture-supply means operatively connecting fuel bowl with mixing chamber and responsive to engine suction depending upon carburetor throttle position, and means operatively connecting fuel bowl with mixing chamber adapted for inducing an acceleration fuel mixture supply into mixing chamber in response to equalization of pressure differential between mixing chamber and the atmosphere depending upon sudden throttle opening.

28. A carburetor for an internal combustion engine comprising, in combination, total-air-supply-control means contained in a choke tube operatively attached to intake end of an air-admission cylinder containing an air-flow-responsive spring-loaded axially-movable perforated piston operatively connecting with a perforated bar slidable in and guided by a casing and a self-adjusting guide-cover embodying a fuel-metering mechanism mounted on a central body having a fuel bowl therein, a main fuel duct communicating between the bowl and a plurality of vertically extending jet feeder ducts of varying discharge area in vertical juxtaposition with fuel perforations provided in casing, the said bar being adapted to control selectively the outlets of said perforations, primary air entry ports connecting discharge end of cylinder with distribution air ports adapted to pass primary air around fuel jet outlets, means adapted for improving air-fuel-mixture combustibility embodied in a hot spot chamber in the body formed with conventional corrugations or riffles in open communication between exhaust manifold and exhaust pipe of engine, conventional means adapted to control the operative level of fuel in said bowl, a mixing chamber operatively connected with said cylinder and central body at its intake end and having at said end an auxiliary air entry port communicating with said cylinder and with a plurality of discharge ports in the periphery of a piston valve seat having a central bore controlled by a throttle valve adapted for manual control over the admission of primary-air-fuel-mixture supply, the said ports being adapted for control by a normally-closed perforated piston valve axially movable in said chamber by means of operative connection with a centrifugal governor, the discharge end of mixing chamber being operatively fastened to an impeller housing adapted for connections with intake manifold of engine and containing means adapted for finally mixing and compacting the total-air-fuel charge to the intake manifold, said means being embodied in a conventional impeller adapted to revolve in impeller housing by reason of operative connection with a shaft of an engine-generator-speed-responsive motor adapted to function at a speed in multiple ratio with any given engine speed, and also operatively connected to said shaft and within the mixing chamber being the said centrifugal governor, means adapted to supply an idling fuel-mixture supply responsive to engine suction depending upon carburetor throttle position, said means being embodied in a duct-perforated fuel and air plug operatively connected with said fuel bowl and mixing chamber, and sudden-throttle-opening-responsive acceleration fuel-metering-supply means embodied in a perforated piston valve normally closing against spring tension the discharge end of a cylinder operatively connected with mixing chamber and the atmosphere, said valve being adapted to move axially in said cylinder.

29. In combination with an internal combustion engine carburetor equipped with an impeller in operative combination with the other means as and for the purposes illustrated and described in this specification including air and fuel supply means, engine-suction-induced air-flow-responsive fuel-discharge-control means, means for conducting primary air supply past the fuel-discharge outlets, means for controlling admission of primary-air-fuel-mixture supply, means for automatically admitting and controlling auxiliary air supply and total-air-fuel-mixture supply and for improving homogeneity of and compacting total-air-fuel-mixture-charge to the intake manifold, electrically operated means adapted for connection with electrical system of engine and operatively attached to and adapted for actuating the said fuel-mixture-compacting means at a speed in ratio with and greater than any given engine speed.

30. In combination with a cylinder having a uniform major bore portion forming shoulders respectively with a minor bore inlet portion and a minor bore outlet portion, the inner ends of said bore portions being in open communication, a perforated member slidable in said major bore portion against resilient means normally urging said member toward said inlet end shoulder, the perforations of said slidable member being adapted to provide means of communication between said minor bore portions and to pass therethrough at all times and at any position of said member a pressure-induced flow of gas substantially satisfying the volumetric capacity of said minor bore outlet portion and to move axially in said major bore portion in response to and in ratio with speed of such flow.

31. In a carburetor for an internal combustion engine, in combination, a cylinder having a uniform major bore portion forming shoulders with a minor bore inlet portion and a minor bore outlet portion, a fuel-discharge-control means operatively connected with automatic actuating means, the last said means comprising a perforated member in said major portion and adapted to pass through itself at all times and at any position in said cylinder a pressure-induced flow of air or other gas substantially satisfying the volumetric capacity of said minor bore outlet portion and to move axially in said major bore portion in response to and in ratio with speed of such flow.

32. In a carburetor for an internal combustion engine, in combination, fuel-discharge-control means contained in a cylinder having a major bore portion in communication with a minor bore inlet portion and a minor bore outlet portion, said means comprising a perforated slide bar operatively connected with a perforated piston adapted to pass through itself at all times and positions a pressure-induced flow of air or other gas substantially satisfying the volumetric capacity of said minor bore outlet portion and to move axially in said cylinder against resilient means in response to and in ratio with speed of such flow.

OLAF OSWALD.